United States Patent
Norton et al.

(10) Patent No.: US 11,470,432 B2
(45) Date of Patent: Oct. 11, 2022

(54) AUTOMOTIVE INTERIOR ACOUSTIC TESTING AND DEVELOPMENT ENVIRONMENT

(71) Applicant: FORD GLOBAL TECHNOLOGIES, LLC, Dearborn, MI (US)

(72) Inventors: Alan Norton, West Bloomfield, MI (US); Chacko Abraham, Birmingham, MI (US); Olivia S. Pan, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 612 days.

(21) Appl. No.: 16/659,805

(22) Filed: Oct. 22, 2019

(65) Prior Publication Data
US 2020/0143705 A1     May 7, 2020

Related U.S. Application Data

(60) Provisional application No. 62/756,129, filed on Nov. 6, 2018.

(51) Int. Cl.
    *H04R 29/00*     (2006.01)
    *G09B 23/14*     (2006.01)
    (Continued)

(52) U.S. Cl.
    CPC ........ *H04R 29/001* (2013.01); *G01M 99/008* (2013.01); *G09B 9/00* (2013.01); *G09B 23/14* (2013.01); *H04R 29/004* (2013.01)

(58) Field of Classification Search
    CPC ........ G09B 23/14; G09B 9/00; H04R 29/001; H04R 29/004
See application file for complete search history.

(56) References Cited

U.S. PATENT DOCUMENTS

| | | | |
|---|---|---|---|
| 7,899,656 B2 | 3/2011 | Crutchfield, Jr. | |
| 8,761,419 B2 | 6/2014 | Devantier et al. | |
| 9,794,720 B1 | 10/2017 | Kadri | |

FOREIGN PATENT DOCUMENTS

| | | | |
|---|---|---|---|
| CN | 103813255 B | 11/2017 | |
| JP | 2006311202 A | 11/2006 | |
| JP | 2007256521 A | * | 10/2007 |

OTHER PUBLICATIONS

Gorman, R. & Krylov, Victor (2004). Investigation of acoustic properties of vehicle compartments using reduced-scale simplified models. Proc. IOA, 2004, 26(2), 37-48. Proceedings of the Institute of Acoustics. 26. 37-48.

* cited by examiner

*Primary Examiner* — Nathaniel J Kolb
(74) *Attorney, Agent, or Firm* — Frank L. Lollo; MacMillan, Sobanski & Todd, LLC

(57) ABSTRACT

A vehicle cabin simulator module provides flexible reconfiguration of transducer locations for evaluating acoustic performance in a vehicle design at a prototyping stage. A frame lattice defines a plurality of cavities around an interior space. A plurality of transducer assemblies are mounted in selected ones of the cavities, each assembly having a faceplate mounting a transducer for acoustic coupling with the interior space. Blank panels are mounted in other selected cavities to shutter the respective cavities. A covering liner is applied to an inner side of the frame lattice. Wiring is provided to interconnect the transducers with a signal processor. The frame lattice further defines a door section radially movable for enclosing the interior space at a closed position and for providing ingress and egress to the interior space at an open position.

13 Claims, 10 Drawing Sheets

(51) Int. Cl.
*G09B 9/00* (2006.01)
*G01M 99/00* (2011.01)

AUTOMOTIVE INTERIOR ACOUSTIC TESTING AND DEVELOPMENT ENVIRONMENT

CROSS REFERENCE TO RELATED APPLICATIONS

This application claims the benefit of U.S. Provisional Application Ser. No. 62/756,129, filed Nov. 6, 2018, which is incorporated herein by reference.

STATEMENT REGARDING FEDERALLY SPONSORED RESEARCH

Not Applicable.

BACKGROUND OF THE INVENTION

Developing and testing acoustic scenarios (e.g., installation positions and performance characteristics of audio transducers, such as speakers and microphones) which are intended for an automotive environment inevitably entails the construction of a prototype development or demonstration vehicle. The typical prototype vehicle will contain multiple loudspeakers and microphones for the multimedia entertainment system, hands-free telephone system, driver information system, and voice-activated control system, among others. These transducers can be mounted in both commonly-used and non-standard positions in the vehicle's interior depending upon availability of locations dictated by the layout and contents of the passenger cabin of the vehicle being prototyped. Testing and evaluation using the prototype vehicle includes cycling through a variety of possible acoustic scenarios related to music reproduction, chimes and warnings, cues for driver information, or telephony, for example. The current method requires significant fabrication, and during the evaluation renders an expensive prototype vehicle unavailable for other testing purposes. Further inflexibility is encountered, if after initial fabrication, a change in the position or orientation of a loudspeaker or microphone is deemed necessary. In this case, new holes in sheet metal or interior parts must be made while others are closed. In addition to the impracticality of creating a physical prototype that is time consuming and expensive, the physical robustness of the prototype is very difficult to ensure and subsequent demonstrations and development measurements are impaired by unwanted excitation and resonance of interior parts (e.g., buzz, squeaks, and rattles).

SUMMARY

The invention is a simulator chamber which uses a sound scaffold wherein sound units can be duplicated in ceilings, floors, and side walls to hold speakers, microphones, other acoustic transducers, and light sources. A layer of acrylic/glass (which can include either diffusion layers or light sources to simulate exterior lighting) is used to simulate the vehicle windows. In the sides and roof, each cavity is individually reconfigurable with either a transducer assembly or a blank. A side section along one of the walls is slidable away from the chamber to allow ingress/egress of people for setting up interior structures and for occupying the vehicle to experience transducer operation during testing. A rolling drawer with honeycomb-shaped cavities slides underneath the floor of the module to allow mounting of corresponding transducers at the bottom of the chamber.

Each sound unit may contain a box with a transducer faceplate and soldered wiring connections to wire cables that run to a signal processor. The faceplates can be laser cut or can be manufactured using CNC techniques to provide an aperture with predetermined sizes. The scaffold is placed behind a stretched-fabric interior panel. A typical blank corresponds to a faceplate without any aperture or transducer.

In one important aspect of the invention, a vehicle cabin simulator module comprises a frame lattice defining a plurality of cavities around an interior space. A plurality of transducer assemblies are mounted in selected ones of the cavities, each assembly having a faceplate mounting a transducer for acoustic coupling with the interior space. Blank panels are mounted in other selected cavities to shutter the respective cavities and ensure the continuation of the acoustic boundary. A near acoustically transparent covering liner is applied to an inner side of the frame lattice. Wiring is used to interconnect the transducers with amplifiers and an audio signal processor. The frame lattice defines a door section radially movable for enclosing the interior space at a closed position and for providing ingress and egress to the interior space at an open position.

DETAILED DESCRIPTION OF THE INVENTION

Figure 1:
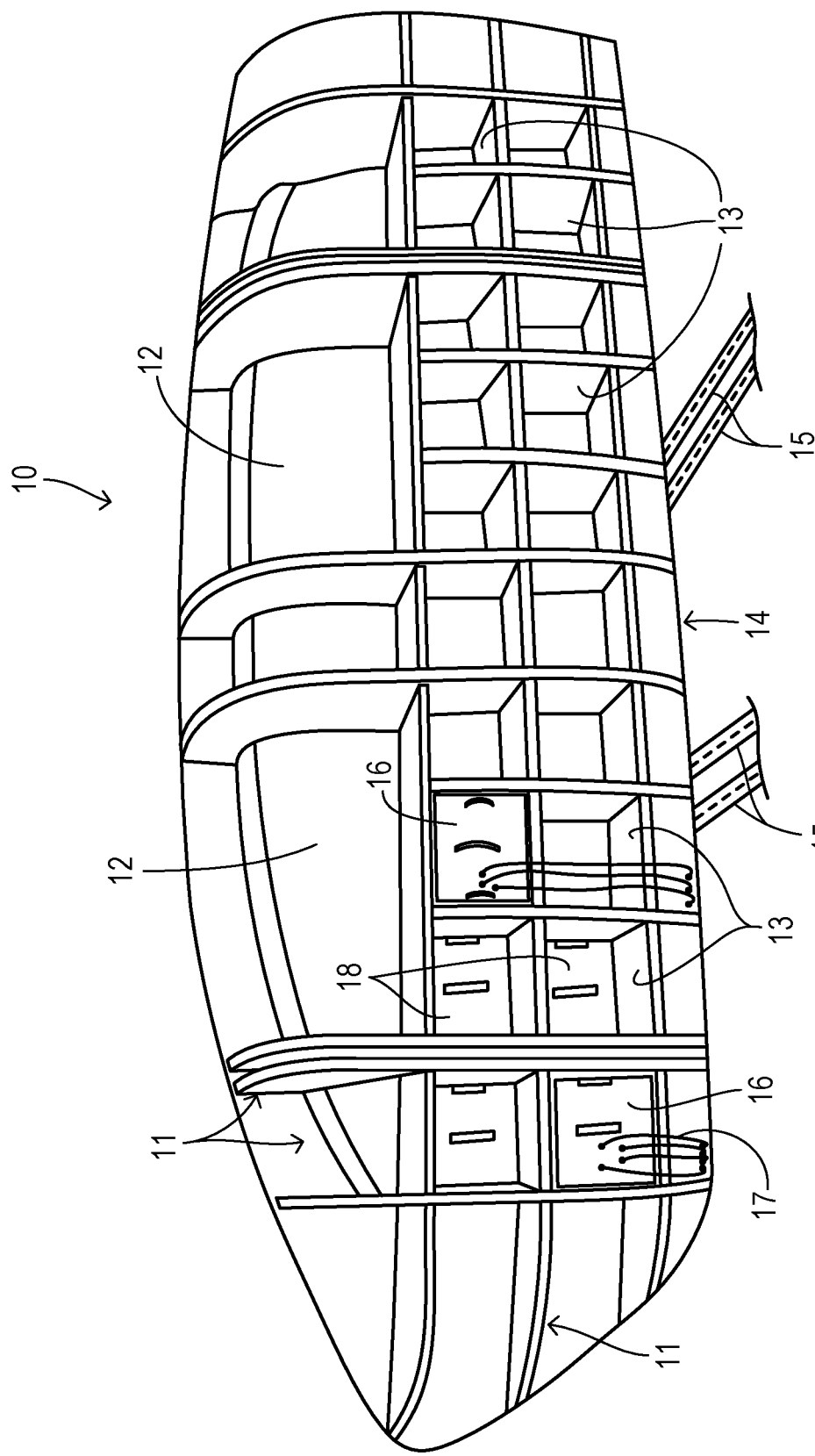
FIG. 1 is a side, perspective view of a simulation module in a closed state.

In one preferred embodiment, a solid wooden structure is constructed to approximate the inside cabin dimensions of a vehicle (although other structural materials such as molded plastics or composite materials can also be used). The structure has a frame with internal dimensions to match a passenger cabin of a vehicle to be modeled. The structure can be grown or shrunk by adding or removing additional shelves (i.e., panels or braces) and sections of speakers to re-configure to different passenger cabin sizes. The frame has the form of a scaffold for receiving boxes or blanks that are loaded externally into respective compartments (i.e., cells or cavities) arranged along an outer perimeter of the structure, providing installation of vehicle acoustic transducers (speakers and/or microphones) at locations that represent those chosen in an actual vehicle. The interior volume approximates that of an actual vehicle (e.g., vehicle prototype), and using configurable interior panels it may be freely configured to test and demonstrate a wide range of use cases.

The cells or cavities in the scaffold are preferably formed of a standard dimension around all perimeter edges of the simulation environment to facilitate the installation of transducers (e.g., loudspeakers or microphones) in freely selectable locations. Shallower versions of the same dimensional standard cavities are mounted in the roof section to enable the installation of overhead transducers. Sealed or ported transducer housings matching the standard dimensions are provided, such that they may be installed in any position on the perimeter, roof, or floor areas of the simulation environment. The mounted transducers can be aligned as desired in relation to the backside of the interior surfaces. The acoustic volume of the standard enclosures may be reduced by including interior baffling or enclosures around the selected transducer.

Interior surfaces of the wooden structure are trimmed with acoustically transparent materials (e.g., woven cloth) to completely visually obscure any transducers or other sensors from within the simulation environment. At the same time, acoustic transparency is achieved enabling representative measurements and subjective evaluation to be made (representing that of a permanently installed transducer covered with a grill within a vehicle).

The interior of the simulation environment preferably hides the transducers so that the environment is free from technical cues, branding, or focal points that may be identifiable as speaker grills or microphones that might influence expectations of a listener. This contributes to consistency in subjective comparisons made of differing configuration scenarios during testing within the simulation environment.

Solid blank sections of the standard dimension are provided to fill any unused cavity. This ensures maintaining of the acoustic boundary of the passenger space, as would be the case within an actual vehicle environment.

The construction allows widely differing configuration scenarios to be tested without disruption of the visually neutral interior. Seating may be freely configurable within the acoustic simulator's interior, allowing rapid configuration of seat orientation and count.

If desired, a representation of a vehicle's interior glass can be provided by installation of semi-transparent heat formed Plexiglas. Other materials, such as real glass, may also be used.

Plausibility of a human experience and a mental connection to an actual vehicle is provided by constructing the exterior shape of the simulation environment to suggest the overall shape of a vehicle. Entry and exit to the simulation environment is provided by a sliding section of the side wall. This enables free configuration of the installed standard dimensioned transducer housings whilst still conveniently enabling the ability for the section to slide open and closed. Alternative entrance arrangements can also be deployed.

The standard cavity dimension is preferably selected such that sufficient closed box volume is provided for a standard vehicle low frequency loudspeaker (mid-woofer) whilst at the same time enabling an array or matrix of cavities that supports overall visual harmony from outside of the simulation environment.

The simulation environment is preferably provided with a removable floor supported by a honeycomb of cavities. This enables both the routing of cabling and, if desired, the installation of transducers in the floor of the simulation environment.

Acoustically absorbent materials are attached to the inside surface of the blank cavity panels as necessary. If an acoustic reverberation time representing an actual vehicle is known at the time of performing simulations, the absorbent materials can be replaced with nonabsorbent materials that simulate the reverberations.

An electrical architecture is provided that allows multiple channels of audio outputs and inputs to be connected to transducers installed in the simulation environment. A rapid prototyping software environment is used to rapidly model audio signal flows and route them to transducers installed in the simulation environment.

A second electrical architecture is provided that allows for lighting throughout the prototype to provide additional stimuli to reinforce audio cues.

Combining the innovations listed above, it is possible to rapidly prototype acoustic arrangements that are intended for application in a vehicle's interior. A very significant amount of time can be saved because once a transducer has been installed in a standard-dimensioned box it may be re-located to represent almost every potential installation position in a vehicle within seconds and then connected up and actively available in a matter of minutes. Acoustical measurements and subjective listening comparisons of different positions can be easily made using A-B-A types of comparisons by electrically switching between standard dimensioned boxes in different locations. Subjective listening evaluation and clinics can be quickly made without the subjective influence of the vehicle or an audio system brand or layout.

FIG. 1 shows a simulation/environmental module 10 as a generally vehicle-like structure with an outer-body support frame or lattice made of various intersecting wooden panels 11. Panels 11 may be vertically and horizontally arranged along generally orthogonal directions to provide support for interior cabin walls as well as window mock-ups. The window mock-ups are comprised of a plurality of light transmissive panels 12 mounted to the inner side of the frame lattice which allow passage of light (either translucent or transparent) in order to simulate windows of a passenger cabin of a vehicle. Translucent window mock-up panels may also be used as a projection surface for externally projected video images. In this way a driving simulation can be realized. The lattice of support panels 11 creates a scaffold defining transducer cavities 13, any of which can be mounted with either a transducer faceplate/enclosure or a blank. A door section 14 of the frame is mounted on rails 15 for radial (i.e., sideways) movement to an open position in order to provide ingress and egress as shown in FIG. 2.

Frame lattice 10 is comprised of a plurality of vertical and horizontal panels 11, which results in a reconfigurable orthogonal grid which is adapted for adding and removing selected panels to modify a size and shape of the interior space and the placements of cavities 13. Removable clips, brackets, or other temporary fasteners may be used to secure panels 11 according to a desired lattice shape to allow for easy adjustment and reconfiguration.

Selected ones of cavities 13 can be fitted with a loudspeaker enclosure 16 from which cables 17 emerge in order to connect a transducer or transducers within enclosure 16 to a control/testing unit (not shown). Other cavities 13 can be fitted with a blank 18 acting as a shutter to maintain acoustic isolation between an interior and exterior of module 10 and to ensure the interior acoustic boundary is maintained.

Figure 2:
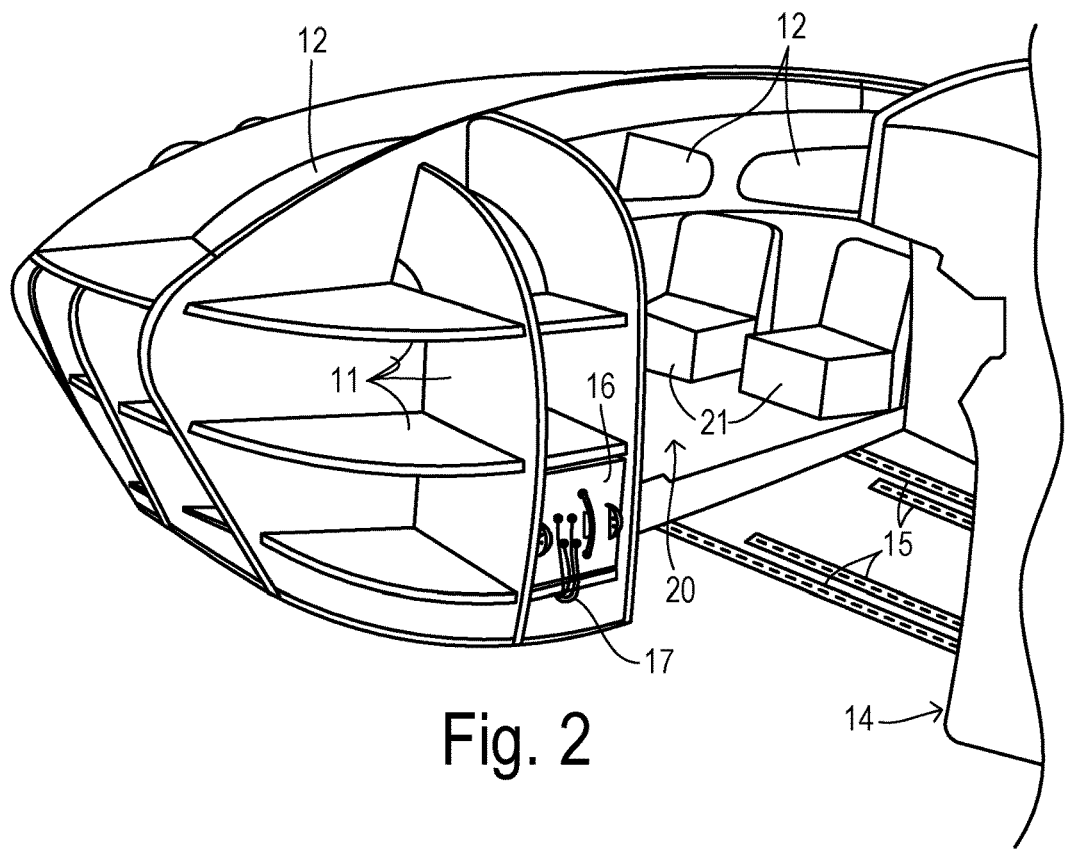
FIG. 2 is a side, perspective view of a simulation module in an open state.
Figure 3:
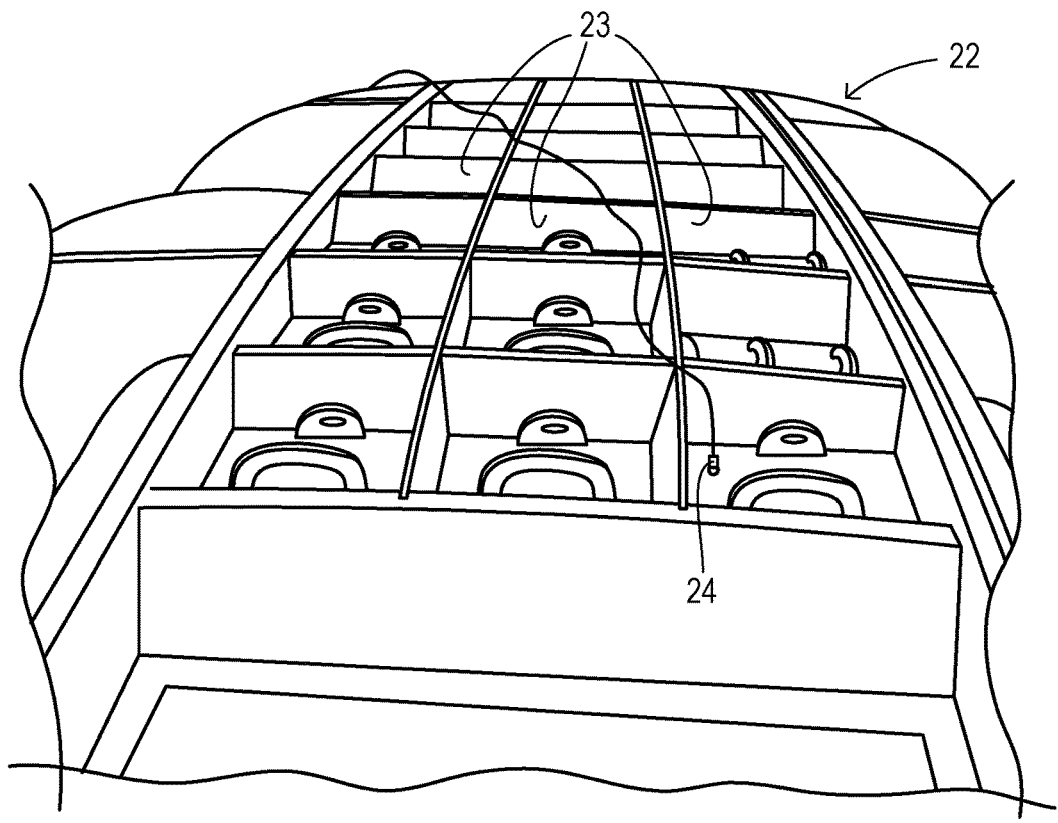
FIG. 3 is a perspective view along a top side of the module of FIG. 1.

FIG. 2 shows an interior cabin area 20 which includes seats 21 to accommodate human listeners during an evaluation. Seats 21 are preferably reconfigurable (e.g., movable to various locations in interior cabin area 20) to simulate desired passenger locations for interacting with the transducers mounted in cavities 13. The environment includes a roof section 22 shown in FIG. 3 having corresponding cavities 23 for receiving the same or similar transducer boxes or blanks. A roof mounted transducer 24 is affixed to a faceplate that can be moved from one cavity 23 to another in order to simulate different transducer placements.

Figure 4:
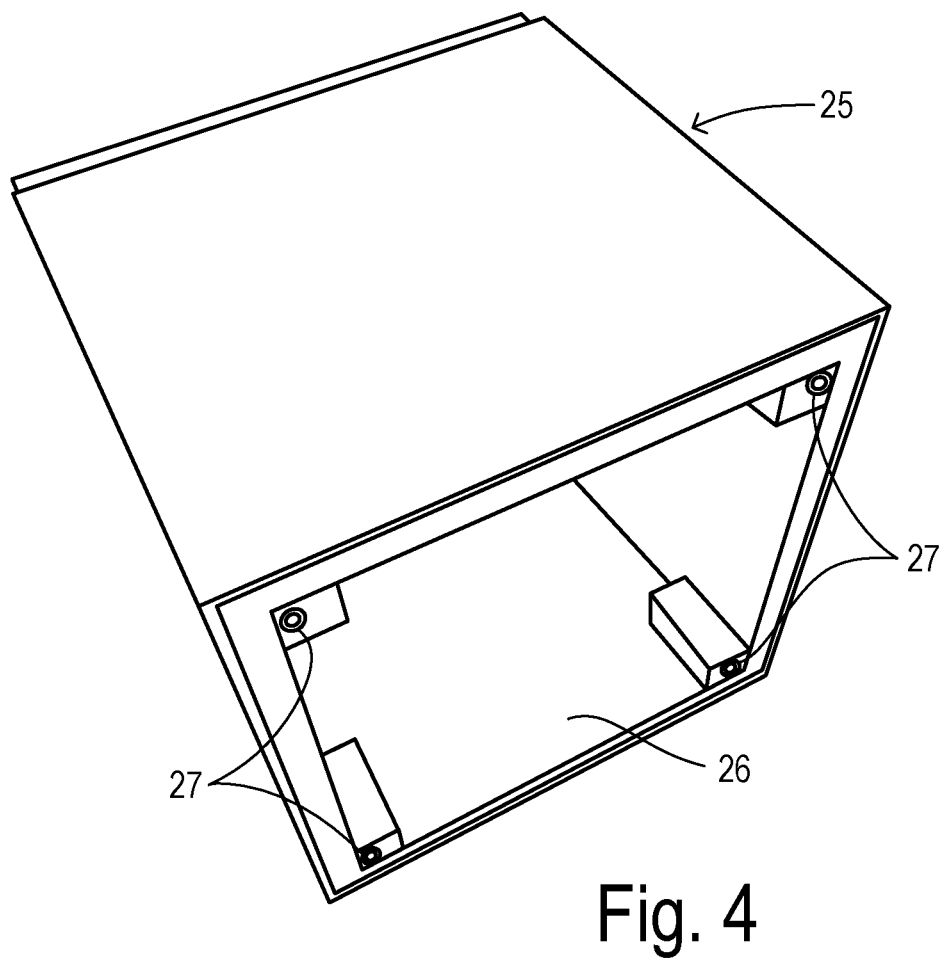
FIG. 4 is a perspective view of a transducer box.
Figure 5:
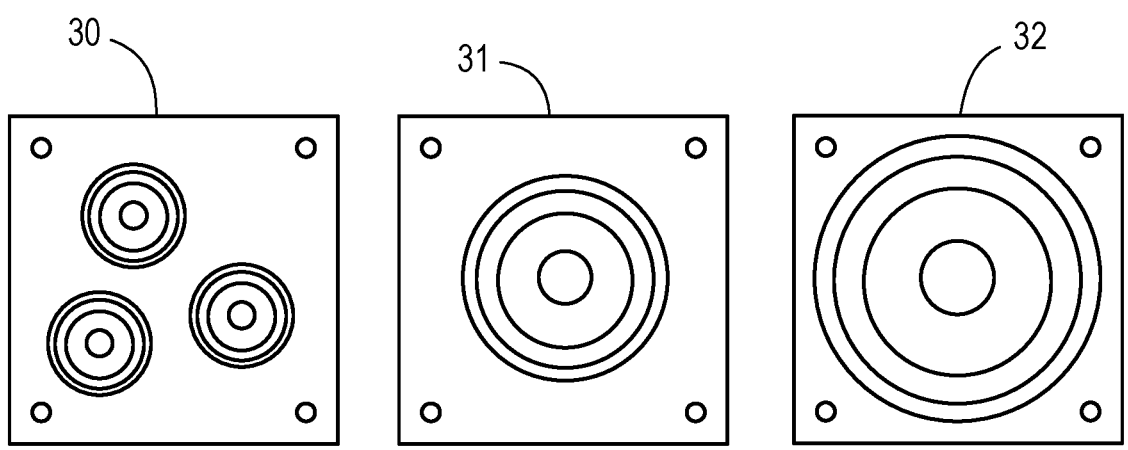
FIG. 5 is a front view of faceplates having various configurations.
Figure 6:
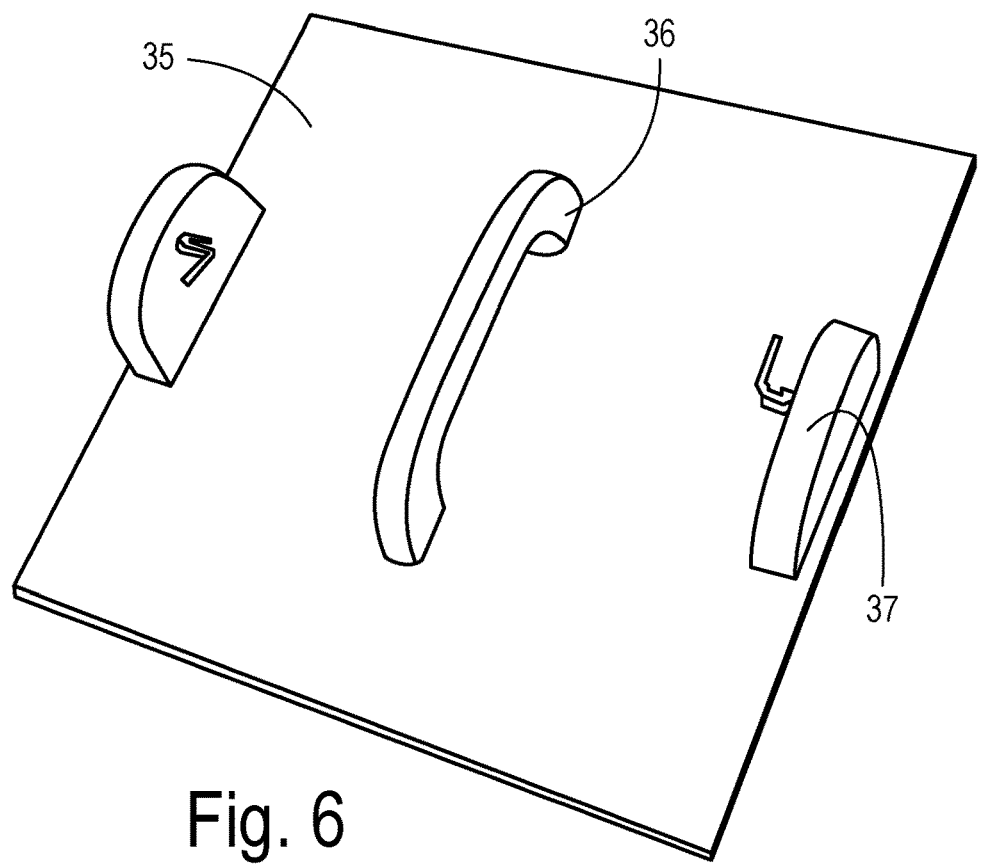
FIG. 6 is a perspective view of a blank panel.

FIG. 4 shows a first embodiment of a transducer box 25 adapted to fit within one of cavities 13 or 23. Transducer box 25 has an open face 26 and fastener holes 27 for receiving a faceplate or baffle carrying speakers and/or microphones of various sizes. FIG. 5 shows various examples of faceplates 30, 31, and 32 and corresponding transducers. For transducers not needing an enclosure, a faceplate carrying the transducer can be adapted to attach directly to any particular cavity at an interior end (i.e., the end closest to the interior space). For cavities not having a transducer installed, a blank panel 35 as shown in FIG. 6 is inserted. Each blank 35 may have a handle 36 and latching mechanisms 37 to retain the blank (preferably at the interior end of the cavity).

Figure 8:
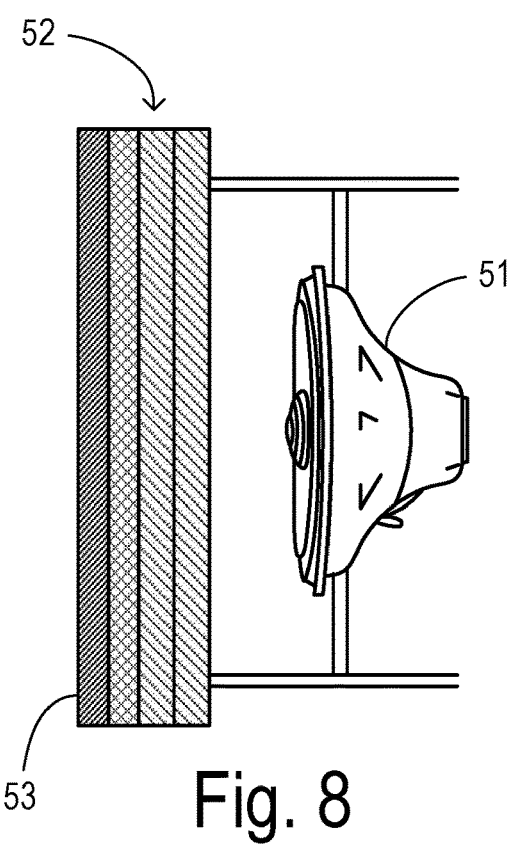
FIG. 8 is a side view showing an interior cabin wall in cross section suspended in front of a transducer.
Figure 7:
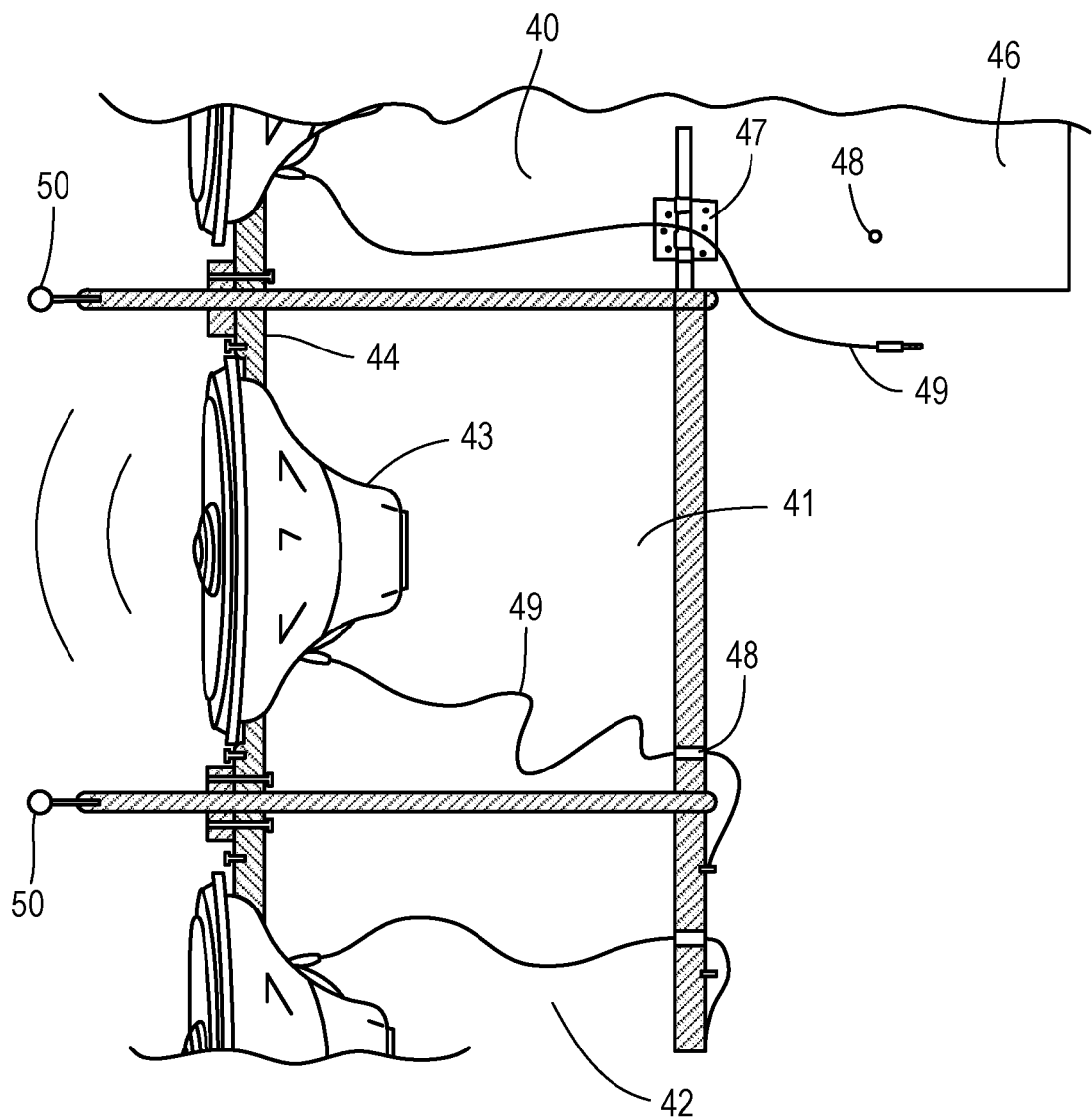
FIG. 7 is a side cross-sectional view showing cavities of the module with mounted transducers.

FIG. 7 is a side cross-sectional view showing several adjacent cavities 40, 41, and 42 receiving speaker-box assemblies, including a speaker 43 mounted to a baffle or faceplate 44 in an enclosure 45 occupying cavity 41. An adjacent speaker-box assembly shows a backwall 46 mounted via a hinge 47 and pivotable to an open position as shown. An aperture 48 is provided in backwall 46 for passing speaker wires 49. At the opposite side of the cavities, the frame includes mounting posts 50 which project toward the cabin interior wall to support interior liners forming the visible surface within the passenger compartment. As shown in FIG. 8, a speaker 51 creates sound waves to pass through an interior cabin wall 52 which is preferably comprised of a composite structure with a fabric sheet 53 stretched over a sculpted panel wall or shell 54 (e.g., formed of molded plastic) according to a desired styling of the passenger cabin. Composite wall section 52 may be one of many separate composite sections that attach side-by-side as a covering liner around the side walls and roof of the simulated passenger cabin. The plurality of light transmissive panels 12 are disposed adjacent to the composite sections within openings in the covering liner.

Figure 9:
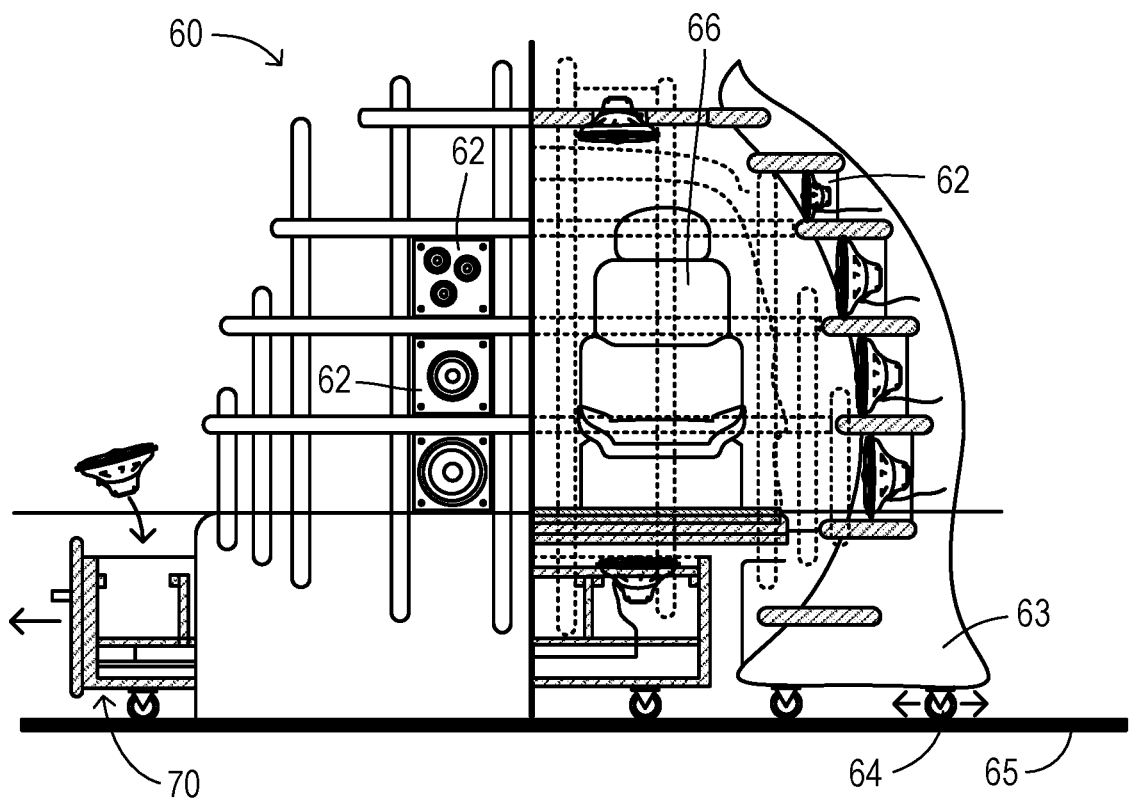
FIG. 9 is partial cross-section end view of the module.

FIG. 9 shows an end view in partial cross-section for an alternative embodiment of an environment 60. A scaffold 61 supports transducer elements 62 at various locations. A side door 63 is supported by rollers 64 movable along a track 65 for opening and closing the compartment so that a person can enter and occupy a seat 66. The system for mounting of speakers and blanks may include a rollaway section 70 which is likewise supported by rails 65. Rollaway section 70 may have a honeycomb-like set of cavities which can each be fitted with a transducer baffle. Section 70 may be rolled outward from environment 60 for placing transducers at desired locations and then rolled inward beneath the floor of the module.

Figure 10:
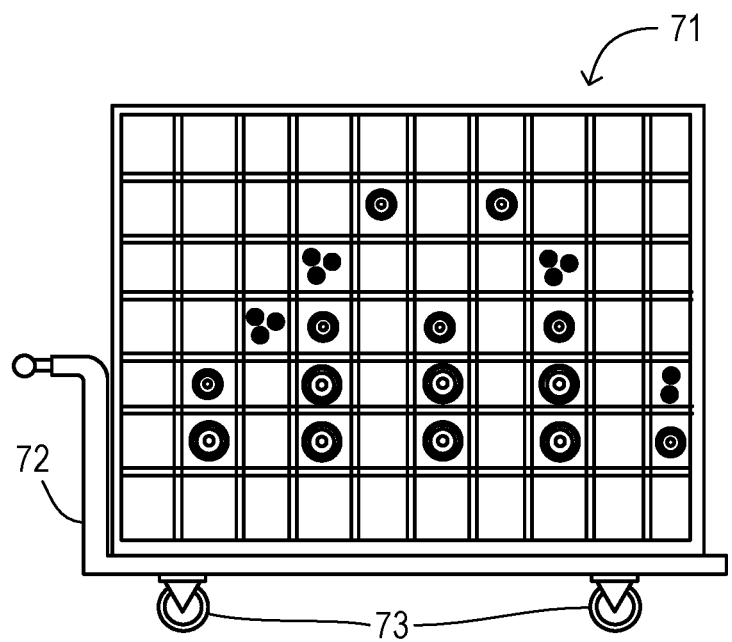
FIG. 10 is a front view of a rollable unit incorporating cavities and transducer boxes for placement along a respective side of the module.
Figure 11:
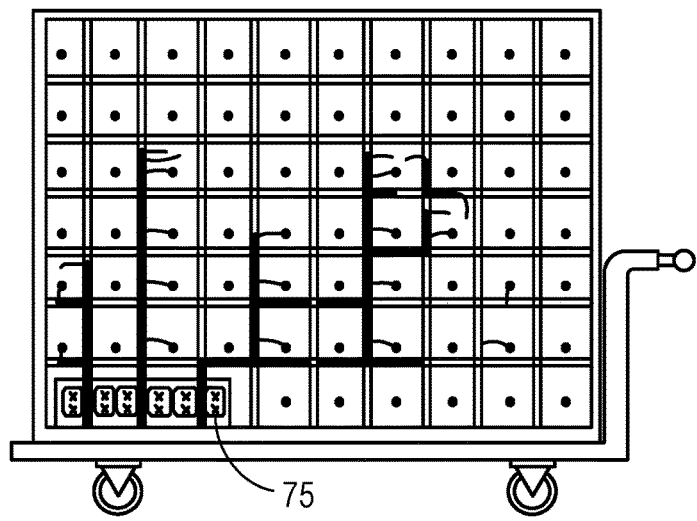
FIG. 11 is a back view of the rollable unit of FIG. 10.

As shown in FIGS. 10 and 11, vertical sides of a simulator module could also be constructed as rollable units. FIG. 10 shows an interior view (not including interior fabric liners) of a rollaway sidewall 71, wherein each cavity has either a transducer baffle or a blank panel. A cart-like frame 72 supports sidewall 71 and has wheels 73 for sliding along rails 65. FIG. 11 shows an exterior side view with wiring routed along various panel walls of the structure between the transducer baffles and a signal processor 75 for exchanging audio signals with the transducers. Using multiple movable wall sections, the frame lattice can be expanded or re-shaped by adding, removing, or substituting sections of lattice having various sizes and shapes to simulate multiple vehicle cabin sizes/layouts.

Figure 12:
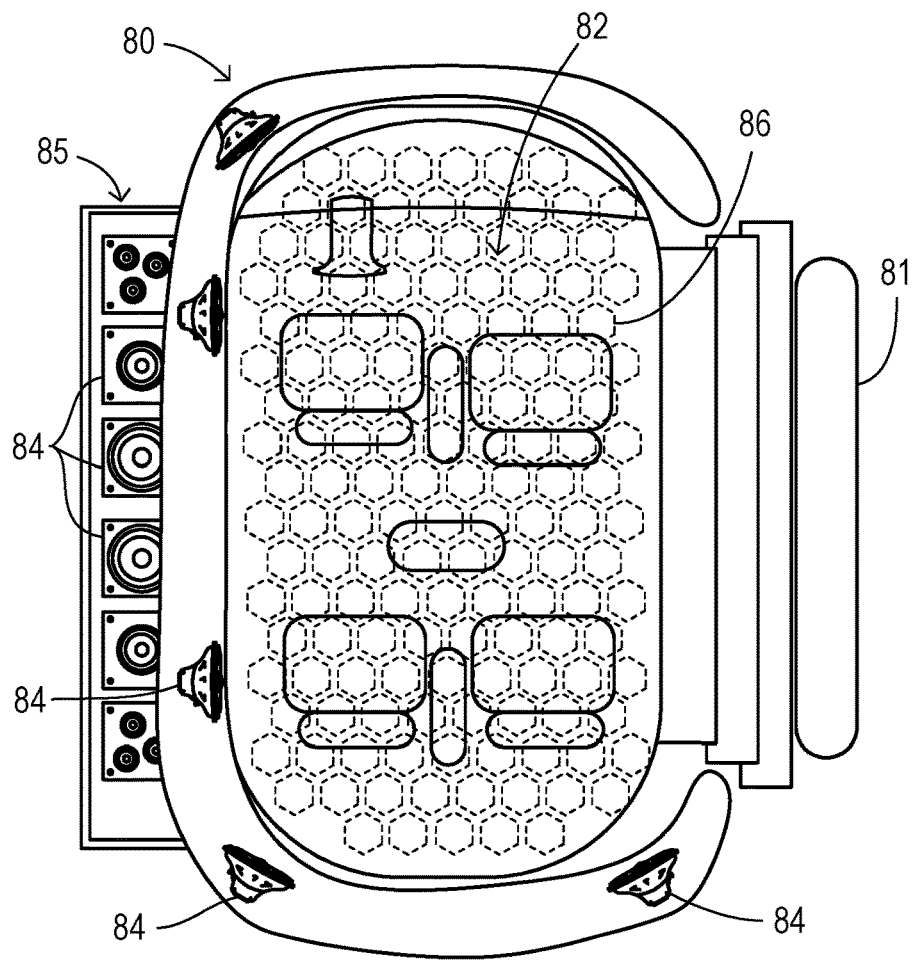
FIG. 12 is a partially transparent top view of the module with a door in an open position and depicting passenger seating and a rolling drawer for transducer cavities.
Figure 13:
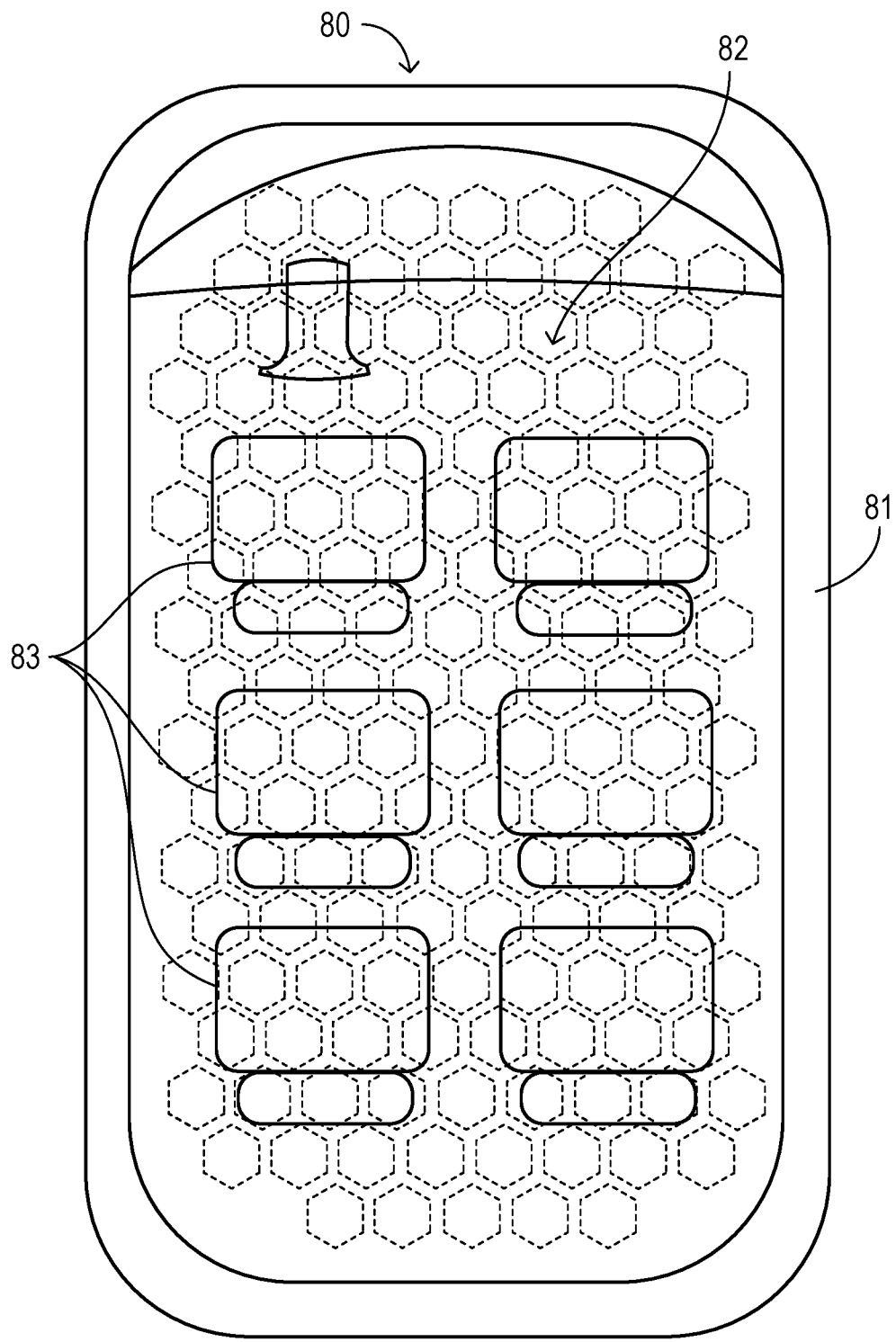
FIG. 13 is a top view of the module of FIG. 12 with the door in a closed position.

FIG. 12 is a partially transparent top view of a module or simulation environment 80 with a movable door 81 providing ingress/egress with a cabin space 82. A plurality of seats 83 are mounted within cabin space 82. Cabin space 82 is surrounded by speaker transducers 84 contained in respective cavities around the sides, in the roof, and in a rollaway floor section 85. Honeycomb cavities 86 are disposed beneath the floor panel of the cabin. Door 81 is at an open position in FIG. 12 and at a closed position in FIG. 13.

Figure 14:
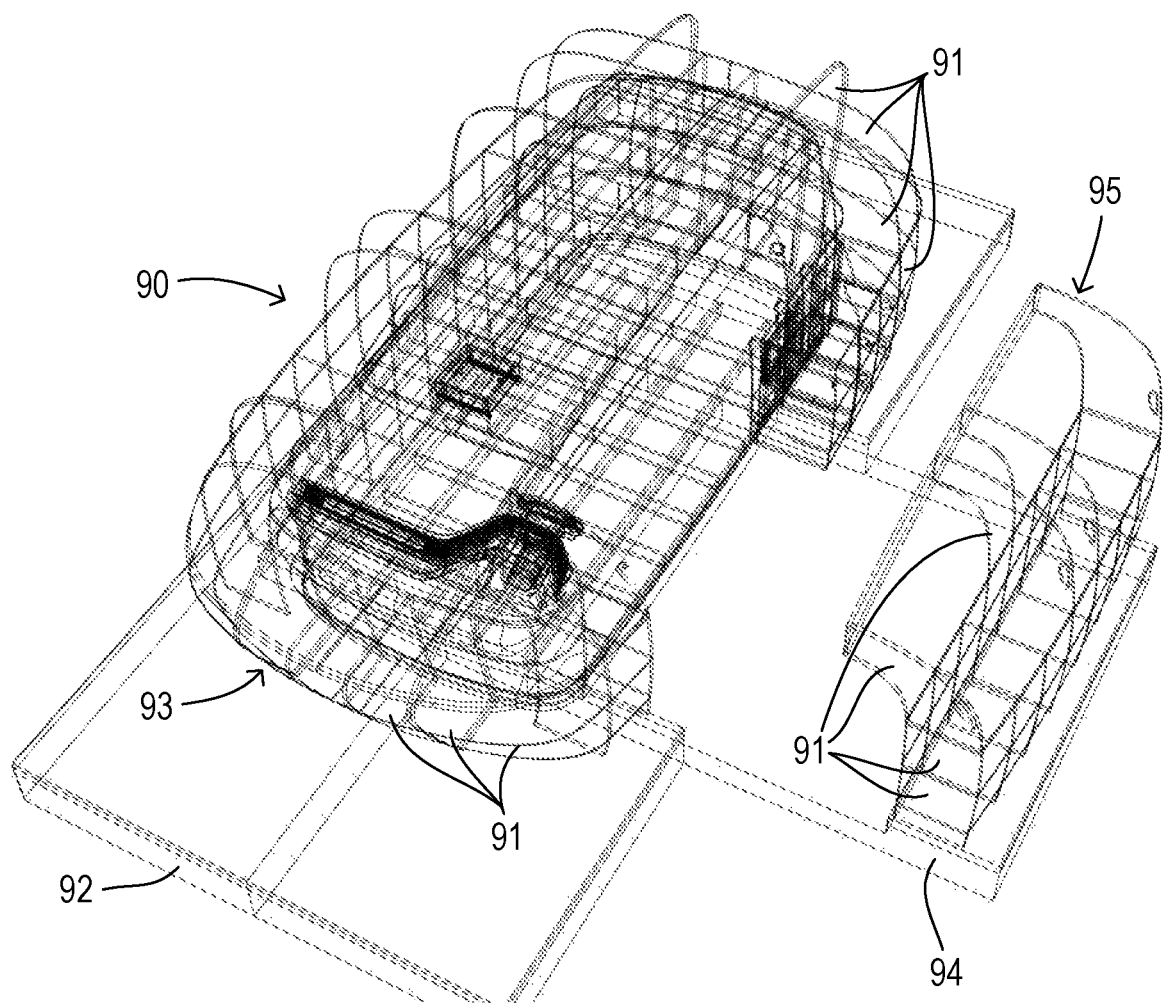
FIG. 14 is a perspective view of another embodiment of a simulation module of the invention with a movable door in an open position.
Figure 15:
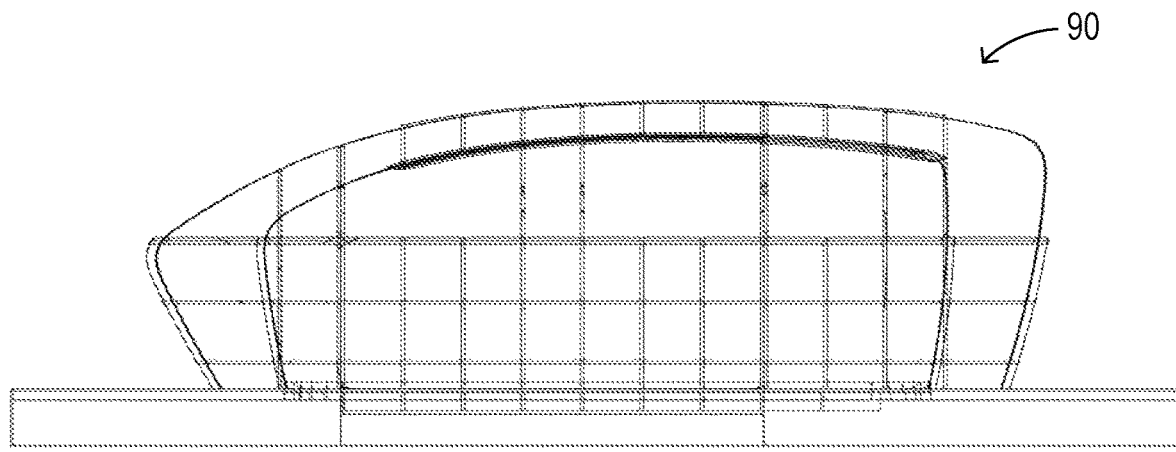
FIG. 15 is a side view of the module of FIG. 14.
Figure 16:
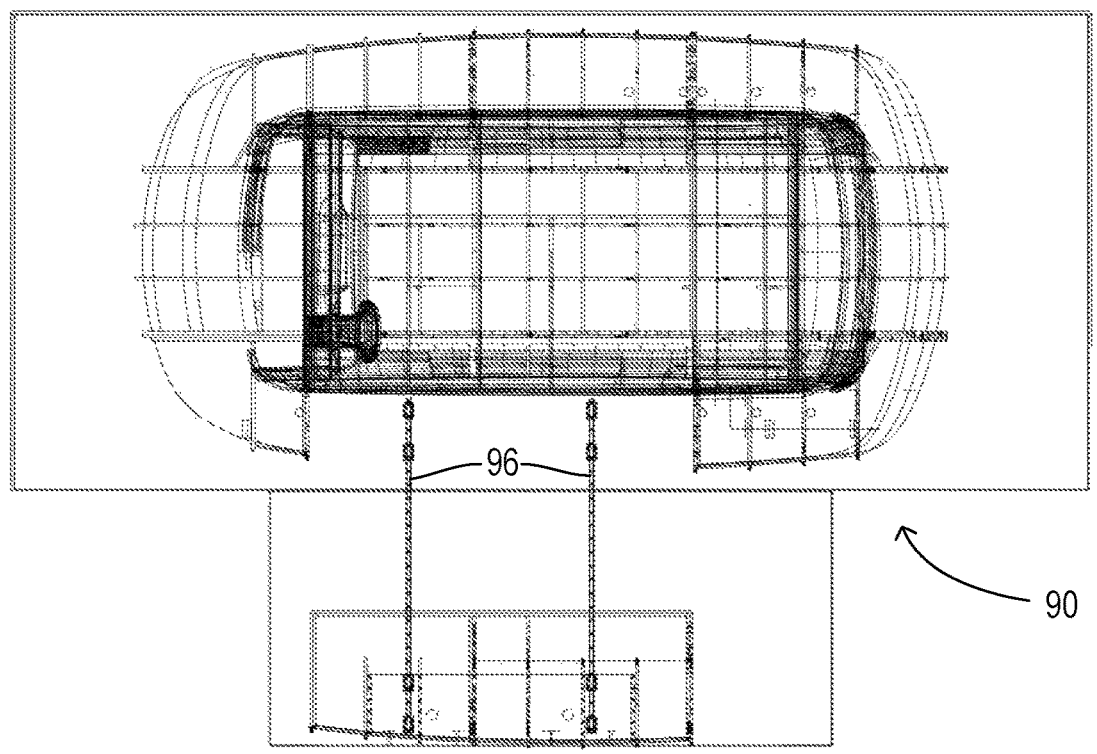
FIG. 16 is a top view of the module of FIG. 14 with the door in the open position.

FIGS. 14-16 depict a wireframe model of a simulation module 90 comprised of a lattice-like frame with interconnected horizontal and vertical panels 91. A fixed floor platform 92 supports a fixed section 93 of the lattice. A sliding floor portion 94 supports a movable door section 95 of the lattice. Sliding floor portion 94 is movable on a carriage 96.

What is claimed is:

1. A vehicle passenger cabin simulator module, comprising:
    a frame lattice defining a plurality of cavities around an interior space;
    a plurality of transducer assemblies mounted in selected ones of the cavities, each assembly having a faceplate mounting a transducer for acoustic coupling with the interior space;
    blank panels mounted in other selected cavities to shutter the respective cavities;
    a covering liner applied to an inner side of the frame lattice; and
    wiring to interconnect the transducers with a signal processor;
    wherein the frame lattice defines a door section radially movable for enclosing the interior space at a closed position and for providing ingress and egress to the interior space at an open position.

2. The module of claim 1 wherein the frame lattice is comprised of a plurality of vertical panels and a plurality of horizontal panels as a reconfigurable orthogonal grid adapted for adding and removing selected panels to modify a size and shape of the interior space and the placements of the cavities.

3. The module of claim 1 wherein the frame lattice includes a rollaway section having a wheeled frame and configured to receive a plurality of transducer baffles and blanks at predetermined positions.

4. The module of claim 1 wherein the covering liner is comprised of a fabric layer mounted over a sculpted shell, and wherein a plurality of mounting posts extend from the frame lattice to connect to the shell.

5. The module of claim 1 wherein a plurality of the cavities defined by the frame lattice have a common profile so that the faceplate can be mounted in any one of the plurality of cavities.

6. The module of claim 1 further comprising a plurality of light transmissive panels mounted to the inner side of the frame lattice adjacent the covering liner to simulate windows of the passenger cabin.

7. The module of claim 1 wherein the transducer assemblies comprise at least one loudspeaker and at least one microphone.

8. The module of claim 7 further comprising a signal processor for exchanging audio signals with the loudspeaker and microphone.

9. The module of claim 1 further comprising at least one floor rail for sliding the door section between the closed position and the open position.

10. The module of claim 1 further comprising a plurality of reconfigurable seats mounted in the interior space to simulate desired passenger locations for interacting with the transducer assemblies.

11. A method of testing acoustic performance of a plurality of sound transducers in a simulated vehicle passenger cabin, comprising the steps of:
assembling a frame lattice defining a plurality of cavities around an interior space, wherein the frame lattice defines a door section radially movable for enclosing the interior space at a closed position and for providing ingress and egress to the interior space at an open position, and wherein the frame lattice is comprised of a plurality of vertical panels and a plurality of horizontal panels as a reconfigurable orthogonal grid adapted for adding and removing selected panels to modify a size and shape of the interior space and the placements of the cavities;
mounting a plurality of transducer assemblies in selected ones of the cavities, each assembly having a faceplate mounting a transducer for acoustic coupling with the interior space;
mounting a plurality of blank panels in other selected cavities to shutter the respective cavities;
mounting a covering liner to an inner side of the frame lattice; and
interconnecting the transducers with a signal processor; and
reproducing audio signals exchanged between the signal processor and the transducer to simulate a corresponding configuration of the passenger cabin in a vehicle.

12. The method of claim 11 further comprising the step of:
mounting a plurality of seats in the interior space to simulate desired passenger locations for interacting with the transducer assemblies.

13. The method of claim 11 further comprising the step of:
mounting a plurality of light transmissive panels to the inner side of the frame lattice adjacent the covering liner to simulate windows of the passenger cabin.

* * * * *